United States Patent [19]

Dieck et al.

[11] 4,061,606

[45] Dec. 6, 1977

[54] POLYPHOSPHAZENE POLYMER/ORGANIC POLYMER FOAMS

[75] Inventors: Ronald Lee Dieck; Edwin John Quinn, both of Lancaster, Pa.

[73] Assignee: Armstrong Cork Company, Lancaster, Pa.

[21] Appl. No.: 754,608

[22] Filed: Dec. 27, 1976

[51] Int. Cl.² ............................................. C08J 9/10
[52] U.S. Cl. ................................ 260/2.5 R; 260/2 P; 260/2.5 B; 260/37 N; 260/47 P; 260/823; 260/857 R; 260/858; 260/860; 260/870; 260/877; 260/887; 260/888; 260/889; 260/890; 260/892; 260/897 B; 260/901
[58] Field of Search .................. 260/2 P, 47 P, 2.5 R, 260/860, 870, 888, 892, 897

[56] References Cited

U.S. PATENT DOCUMENTS

| | | | |
|---|---|---|---|
| 3,370,020 | 2/1968 | Allcock et al. | 260/2 P |
| 3,856,712 | 12/1974 | Reynard et al. | 260/2 P |
| 3,856,713 | 12/1974 | Rose | 260/2 P |
| 3,883,451 | 5/1975 | Reynard | 260/2 P |

*Primary Examiner*—Morton Foelak
*Attorney, Agent, or Firm*—Richard J. Hammond

[57] ABSTRACT

This invention relates to blends of polyphosphazenes and organic polymers. The blends of this invention can be formed into coatings, sheets or films or into flexible or semi-rigid foams. The blends are extremely fire retardant and produce low smoke loads, or essentially no smoke, when heated in an open flame.

8 Claims, No Drawings

POLYPHOSPHAZENE POLYMER/ORGANIC POLYMER FOAMS

DESCRIPTION OF THE INVENTION

This invention relates to blends of polyphosphazenes and organic polymers. The blends are useful as fire retardant coatings, sheets, films or flexible or semirigid foams.

Some of the polyphosphazenes employed in the blends of this invention are described in copending application Ser. No. 661,862, filed Feb. 12, 1976, hereby incorporated by reference.

The poly(aryloxyphosphazene) copolymers described in application Ser. No. 661,862 are characterized by repeating

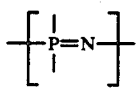

units which contain substituted aryloxy-substituents (preferably substituted in the para position) on the phosphorous atoms in nonregular fashion and which can be represented by the following formulas:

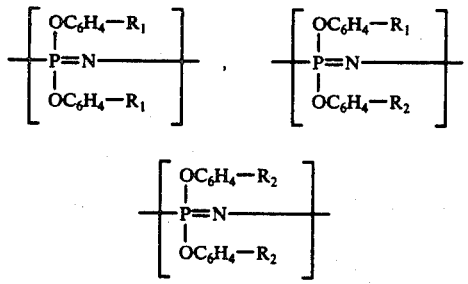

wherein $R_1$ and $R_2$ are the same or different and are hydrogen, a $C_1 - C_{10}$ linear or branched alkyl radical, or a $C_1 - C_4$ linear or branched alkoxy radical substituted on any sterically permissible position on the phenoxy group, with the proviso that when $R_2$ is alkoxy and when copolymers are to be prepared, $R_1$ and $R_2$ are different. Examples of $R_1$ and $R_2$ include ethoxy, methoxy, isopropoxy, n-butoxy, methyl, ethyl, n-propyl, isopropyl, sec-butyl, tert-butyl, tert-pentyl, 2-ethylhexyl and n-nonyl.

It is to be understood that when $R_1$ is the same as $R_2$, homopolymers are formed. Further, it is to be understood that while it is presently preferred that all $R_1$s are the same and all $R_2$s are the same, the $R_1$s can be mixed and the $R_2$s can be mixed. The mixtures may be mixtures of different alkyl radicals or mixtures of different ortho-, meta- and para- isomers. One skilled in the art readily will recognize that steric hindrance will dictate the propriety of using relatively bulky groups in the paraposition on the phenoxy ring since as set forth hereinafter the polymers are made by reacting a substituted metal phenoxide with a chlorine atom substituted on a phosphorus atom. Desirably, groups which sterically inhibit this reaction should be avoided. Absent the foregoing proviso, the selection of the various $R_1$s and $R_2$s will be apparent to anyone skilled in the art based upon this disclosure.

For the sake of simplicity, the polymers used to prepare the blends of the invention which contain the above three repeating units may be represented by the formula $[NP(OC_6H_4-R_1)_a(OC_6H_4-R_2)_b]_n$, wherein $n$ is from about 20 to about 2000 or more. In the case of homopolymers $R_1=R_2$ and $a+b=2$. Copolymeric phosphazenes, e.g., where $R_1$ does not equal $R_2$ can also be represented by this formula where a and b are greater than zero and $a+b=2$.

The above described polymers, as well as those containing reactive sites designated as W below, may be crosslinked and/or cured at moderate temperatures (for example, 200°-350° F.) by the use of free radical initiators, for example, peroxides, using conventional amounts, techniques and processing equipment.

The copolymers used to prepare the blends of this invention may contain small amounts of randomly distributed repeating units in addition to the repeating units described above. Examples of these additional repeating units are:

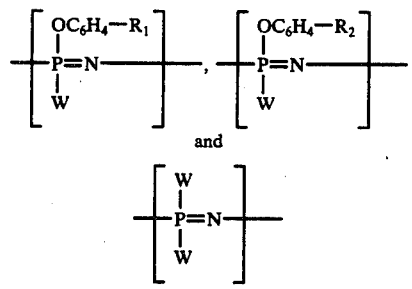

wherein W represents a group capable of a crosslinking chemical reaction, such as, an olefinically unsaturated, preferably ethylinically unsaturated monovalent radical, containing a group capable of further reaction at relatively moderate temperatures, and the ratio $W:[(OC_6H_4-R_1)+(-OC_6H_4-R_2)]$ is less than about 1:5. For the sake of simplicity, the copolymers of this invention which are further reactive may be represented by the formula $[NP(OC_6H_4-R_1)_a(OC_6H_4-R_2)_b(W)_c]_n$, wherein W, $R_1$, $R_2$, $n$ are as set forth above. In the case of copolymers containing W, if $R_1=R_2$, then $b=0$ and $a+c=2$. Where $R_1$ and $R_2$ are not the same, $a+b+c=2$. Examples of W are $-OCH_2CH=CH_2$; $-OR_3CH=CH_2$;

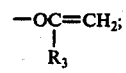

$OR_3CF=CF_2$ and similar groups which contain unsaturation, where $R_3$ is any aliphatic or aromatic radical, especially $-CH_2-$. These groups are capable of further reaction at moderate temperatures (for example, 200°-350° F.) in the presence of free radical initiators, conventional sulfur curing or vulcanizing additives known in the rubber art or other reagents, often even in the absence of accelerators, using conventional amounts, techniques and processing equipment.

It is also possible to use as W in the above formulas, monovalent radicals represented by the formulas (1) $-OSi(OR^4)_2R^5$ and other similar radicals which contain one or more reactive groups attached to silicon; (2) $-OR^6NR^6H$ and other radicals which contain reactive $-NH$ linkages. In these radicals $R^4$, $R^5$ and $R^6$ each represent aliphatic, aromatic and acyl radicals. Like the groups above, these groups are capable of further reaction at moderate temperatures in the presence of compounds which effect crosslinking. The presence of a catalyst to achieve a cure is often desirable. The introduction of groups such as W into polyphosphazene polymers is shown in U.S. Pat. Nos. 3,888,799; 3,702,833 and 3,844,983, which are hereby incorporated by reference.

In general, the processability, smoke production, glass transition temperature and a number of other properties of the polymers are affected by the identity of $R_1$ and $R_2$. In homopolymers, as in copolymers, an increase in the size of $R_1$ or $R_2$ causes a decrease in the open flame smoke generation with a concurrent increase in flammability. However, these changes result in more flexible films and compositions of enhanced foamability. Further, as the mole percent of $R_1$ approaches 100 per cent, the crystallinity of the copolymers increases and their ability to be foamed diminishes. In copolymers containing the group W, it has been found that when the mole per cent of W increases, the degree of cross-linking increases and the ability to be foamed diminishes. Preferred polymers in accordance with the present invention are those containing both $R_1$ and $R_2$. It is contemplated that these copolymers contain a mole ratio of a:b of at least about 1:6 and up to about 6:1, and preferably between about 1:4 and 4:1. It is also contemplated that the mole ratio of $c:(a+b)$ will be less than about 1:5, preferably from about 1:50 to about 1:10.

In one embodiment, these copolymers may be prepared in accordance with the process described in U.S. Pat. No. 3,370,020 to Allcock et al, which description is incorporated hereby by reference. A detailed description, preparatory processes and examples of suitable polyphosphazenes are set forth in said application Ser. No. 661,862.

The organic polymers which can be utilized in the blends of this invention are compatible organic polymers, i.e. polymers which have a backbone which contains repeating covalently bonded carbon atoms, alone or together with any or all of oxygen, nitrogen or sulfur. "Organic polymers", as utilized herein, do not include polymers such as organopolysiloxanes or silanes which contain carbon atoms, but have a silicon or silicon-oxygen backbone. The organic polymers include homopolymers, interpolymers, graft polymers and mixtures or blends of two or more of these, and includes thermoplastic, thermosetting and rubbery polymers. The useful polymers are typically moldable and/or coating film and fiber forming polymers.

A preferred class of organic polymers are organic polymers which are crosslinkable by the same mechanism which crosslinks the polyphosphazene resin with which it is blended.

A preferred group of organic polymers are vulcanizable (i.e. crosslinkable) elastomers. The elastomer can be any vulcanizable natural or synthetic rubber including butyl rubber, chlorinated butyl rubber, ethylene-propylene copolymer, ethylene-propylene-diene terpolymer, chlorosulfonated polyethylene, natural rubber, polyisoprene, polybutadiene, butadiene-styrene copolymer, butadiene-acrylonitrile copolymer, polychloropropene, polyacrylate, polyepichlorohydrin, epichlorohydrin-ethylene oxide copolymers, urethane elastomers or mixtures thereof.

As used herein the term "elastomer" is used in the well known sense to define a rubbery material having a stress-strain curve characteristic of elastomeric materials.

Another group of organic polymers useful in the blends of this invention are non-elastomeric thermoplastic polymers.

The non-elastomeric thermoplastic polymer can be any normally solid thermoplastic organic polymer including polyethylene, ethylene-vinyl acetate copolymer, chlorinated polyethylene, polypropylene, polybutylene, polyvinyl chloride, vinyl chloride-vinyl acetate copolymer, polyvinylidene chloride, vinylidene chloride-vinyl chloride copolymer, polyvinyl ether, polystyrene, styrene-butadene copolymer, polycarbonates, nylons, linear saturated polyesters or mixtures thereof.

Where the thermoplastic polymer is a vinyl resin, e.g., polyvinyl chloride or a vinylchloride copolymer, the resin may be blended with one or more conventional plasticizers. Examples of such plasticizers include esters of straight and branched chain alcohols with aliphatic acids impart low viscosity and good viscosity stability. Typical plasticizers of this type include dibutyl sebacate, dioctyl sebacate, dioctyl adipate, didecyl adipate, dioctyl azelate, triethylene glycol di(2-ethylhexanoate), diethylene glycol diperlargonate, triethylene glycol dicaprylate, 2,2,4-trimethyl-1,3-pentanediol diisobutyrate, and the like. Plasticizers of the aromatic type, such as esters of aliphatic alcohols and aromatic acids or aromatic alcohols and aliphatic acids or aromatic alcohols and aromatic acids are desirable in that they impart good foaming characteristics to a plastisol, although the use of highly aromatic plasticizers is limited by their tendency to yield plastisols of high viscosity. Typical plasticizers of this type include dibutyl phthalate, dicapryl phthalate, dioctyl phthalate, dibutoxy ethyl phthalate, dipropylene glycol dibenzoate, butyl benzyl sebacate, butyl benzyl phthalate, dibenzyl sebacate, dibenzyl phthalate and the like. Other types of plasticizers, such as esters of inorganic acids, including tricresyl phosphate, octyl diphenyl phosphate and the like, alkyd derivatives of rosin, chlorinated paraffin, high molecular weight hydrocarbon condensates and the like can also be used. The plasticizer or blend of plasticizers is chosen to yield a composition of the desired viscosity and/or foaming characteristics.

Generally, the plasticizer is blended with the thermoplastic resin in a range of from 20 to 130 parts by weight of the plasticizer per 100 parts by weight of the resin. Of course, greater or lesser amounts of the plasticizer can be employed, the amount of plasticizer generally being determined by the selection of the particular plasticizer, the particular resin, and the utility of the final product.

The average molecular weight of the above organic polymer may vary widely, for example, from 5,000 to 5,000,000 or even greater but is preferably within the range 10,000 to 200,000. Organic polymers having molecular weights outside these ranges may be used if desired.

Another group of organic polymers useful to form the blends of this invention are the so-called unsaturated polyesters. These polymers are available as mixtures of liquid unsaturated polyester resin and crosslinking monomer.

The liquid unsaturated polyester resins usually comprise a linear or only slightly branched unsaturated polyester. The linear or slightly branched polyester is typically prepared as a condensation or reaction product of an unsaturated polybasic and a polyhydric compound; for example, the condensation product of an unsaturated dibasic acid of alpha-beta ethylenic unsaturation and a di- or trihydric compound, such as a glycol.

Often a saturated polybasic acid or anhydride, such as a dibasic acid, is employed with the unsaturated acid or anhydride to modify the reactivity of the unsaturated resin.

Examples of typical polyhydric alcohols include, but are not limited to: ethylene glycol; 1,2-propane diol; 1,3-propane diol; diethylene glycol; dipropylene glycol; triethylene glycol; tripropylene glycol; 1,2-butane diol; 1,3-butane diol; 1,4-butane diol; neopentyl glycol; 2,2,5-trimethylpentane diol; cyclohexanedimethanol; dibromoneopentyl glycol; dibromobutane diol; trimethylolpropane; pentaerythritol; trimethylpentane diol; dipropoxy adducts of bis phenol A; and dipropoxy adducts of hydrogenated bis phenol A.

Examples of saturated polybasic acids include, but are not limited to: isophthalic acid; orthophthalic acid; terephthalic acid; tetrabromophthalic acid; tetrachlorophthalic acid; tetrahydrophthalic acid; adipic acid; succinic acid; azelaic acid; glutaric acid; nadic acid and the various anhydrides obtained therefrom.

Examples of unsaturated polybasic acids include, but are not limited to: maleic acid; fumaric acid; itaconic acid; citraconic acid and anhydrides obtained therefrom.

Examples of peroxide curable cross-linking monomers employed with the linear polyesters include, but are not limited to: styrene, vinyl toluene; acrylates and methacrylates like methylmethacrylate; alphamethyl styrene; chloro styrene; and diallyl phthalate. The liquid unsaturated polyester resins also typically contain small amounts of inhibitors in order to prevent premature reaction, such as, for example: hydroquinone; quinone and tertiary butyl catechol. These monomers, the saturated acids, the unsaturated acids and the polyhydric compounds may be admixed together in various proportions as is known in the art in order to obtain resins with varying properties, typically in amounts of about 0 to 50% by weight; for example, such as 5 to 45%. Such liquid resin compositions may include a wide variety of other additives to include: viscosity index improvers; rheological agents; flame retardants; thermoplastic polymers; fillers such as hollow glass or plastic microsphere beads; wood flour; silica; diatomaceous earth; pigments, dyes; stabilizers; glass fibers; release agents; extenders; catalysts; alumina surfactants; and other additives (see, for example, compounds in "Unsaturated Polyester", Modern Plastics Encyclopedia, Volume 50, No. 10a, 1973–1974, pp. 66–68, hereby incorporated by reference).

The components of the polyester resins may be varied as is known in the art to impart the desired properties to the cured resin. Typically, flexible resins employ greater amounts of adipates or azelates, while more rigid resins use phthalates, both with a variety of different glycols. Our invention is directed particularly to rigid and semi-rigid polyester foams useful as structural-type foams. Such resins have a formulation, for example, of about 3 to 7 moles of glycol, 1.5 to 3.0 moles of adipic acid, 0 to 1.5 moles of phthalic anhydride, and 2 to 4 moles of maleic anhydride, with from 1.0 to 4 moles of styrene or vinyl toluene.

The liquid unsaturated polyester resins are employed in conjunction with a free-radical curing compound or a compound cable of forming a free radical. The cross-linked initiating compound is typically peroxide, and would include peroxides capable of forming a free radical, particularly alkoxy-free radicals. Such peroxides are characterized by their reaction with amines, metal salts or metal soaps which are a general class of agents known as accelerators or promoters and redox agents.

The blends of this invention are capable of formulation over a wide range of proportions. Preferably, the blend should comprise between about 15% to about 85% by weight of the polyphosphazene and about 85% to about 15% by weight of the organic polymer, based on the mixture of the polyphosphazene and the organic polymer. More preferably, amounts of the above between about 20% to about 80% by weight are employed.

The novel mixtures of this invention, as mentioned above, have good thermal stability. The mixtures are soluble in specific organic solvents such as tetrahydrofuran, benzene, xylene, toluene, dimethylformamide and the like can be formed into films from solutions of the copolymers by evaporation of the solvent. The blends are water resistant at room temperature and do not undergo hydrolysis at high temperatures. The blends may be used to prepare films, fibers, coatings, molding compositions and the like. They may be additionally blended with such additives as antioxidants, ultraviolet light absorbers, lubricants, plasticizers, dyes, pigments, fillers such as litharge, magnesia, calcium carbonate, furnace black, alumina trihydrate and hydrated silicas, other resins, etc., or other adjuvants known useful with the particular organic polymer, without detracting from the scope of the present invention.

The blends may be used to prepare foamed products which exhibit excellent fire retardance and which produce low smoke levels, or essentially no smoke when heated in an open flame. The foamed products may be prepared from filled or unfilled formulations using conventional foaming techniques and agents known to be useful with the organic polymer or the polyphosphazene. A review of foaming processes can be found in "Handbook of Plastics and Elastomers" (C. A. Haper, Ed.), McGraw-Hill, N.Y., N.Y., 1975, Chapter 7, "Plastic and Elastomer Foams", pp. 7–1 thru 7–79.

Thermoplastic foams are well known as are processes for the production thereof by the extrusion of thermoplastic materials which include a blowing or gas producing agent. One particular manner of producing such thermoplastic foams or foamable materials by an extrusion process is to provide a stream of heat plastified thermoplastic material and add or inject into the stream a volatile fluid foaming agent, the fluid foaming agent being generally a non-solvent for the polymer at the extrusion temperature, admixing the blowing agent with the heat plastified gel, bringing the gel to a desired extrusion temperature; that is, a temperature above or below the foaming temperature, depending upon whether a foamed product of a foamable product is desired.

A wide variety of equipment has been employed to prepare thermoplastic foams for extrusion and representative equipment is described in the following U.S. Pat. Nos. 2,669,751; 2,753,595; 2,740,157; 3,151,192; 3,160,688 and 3,751,377.

Unsaturated polyester foams have been prepared using various agents and methods to extend or expand them (for examples see: U.S. Pat. Nos. 3,470,114; 3,673,132 and 3,390,591). These methods include the use of mechanical frothing techniques or the use of chemical blowing agents, with the curing of the resin matrix by a free radical mechanism most usually through the use of a peroxide, frequently in conjunction with an accelerator. The systems are chosen so that expansion of the foam precedes gellation and is coordinated with gellation of the resin matrix.

A particularly useful foaming technique for the blends of this invention comprises the use of chemical blowing agents, i.e. chemical compounds, stable at ordinary room temperature, which decompose or interact at elevated temperatures to provide a cellular foam. Suitable chemical blowing agents include:

| Blowing Agent | Effective Temperature Range ° C |
|---|---|
| Azobisisobutyronitrile | 105–120 |
| Azodicarbonamide (1,1-azobisform-amide) | 100–200 |
| Benzenesulfonyl hydrazide | 95–100 |
| N,N'-dinitroso-N,N'-dimethyl terephthalamide | 100 |
| Dinitrosopentamethylenetetramine | 130–150 |
| Ammonium carbonate | 58 |
| p,p'-oxybis-(benzenesulfonyl-hydrazide) | 100–200 |
| Diazoaminobenzene | 84 |
| Urea-biuret mixture | 90–140 |
| 2,2'-azo-isobutyronitrile | 90–140 |
| Azohexahydrobenzonitrile | 90–140 |
| Diisobutylene | 130 |
| 4,4'-diphenyldisulfonylazide | 110–130. |

| Typical foamable formulation include: | |
|---|---|
| Polyphosphazene-organic polymer blend | 100 parts |
| Filler (e.g., alumina trihydrate) | 0–100 phr |
| Stabilizer (e.g., magnesium oxide) | 2.5–10 phr |
| Processing aid (e.g., zinc stearate) | 2.5–10 phr |
| Plasticizer resin (e.g., Cumar P-10, coumarone indene resin) | 0–50 phr |
| Blowing agent (e.g., 1,1'-azobisform-amide) | 10–50 phr |
| Activator (e.g., oil-treated urea) | 10–40 phr |
| Peroxide curing agent (e.g., 2,5-dimethyl-2,5-di(t-butylperoxy) hexane) | 2.5–10 phr |
| Peroxide curing agent (e.g., benzoyl peroxide) | 2.5–10 phr. |

While the above are preferred formulation guidelines, obviously some or all of the adjuvants may be omitted, replaced or other functionally equivalent materials or other adjuvants such as a distinct organic polymer curing agent, or the proportions varied, within the skill of the art of the foam formulator.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example, 100°–120° F.

The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(tibutylperoxy) hexane, and partially pre-curing in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial pre-cure" foaming technique is that an increase in the molecular weight of the foamable polymer blend prior to the foaming step enables better control of pore size and pore uniformity in the foaming step. The extent of "pre-cure" desired is dependent upon the ultimate foam characteristics desired. The desired foaming temperature is dependent on the nature of the blowing agent and the crosslinkers present. The time of heating is dependent on the size and shape of the mass being foamed. The resultant foams are generally tan in appearance, and vary from flexible to semi-rigid, depending upon the glass transition temperature of polymers employed in the foam formulation, that is to say, the lower the glass transition of the polymers the more flexible will be the foam produced therefrom. As indicated, inert, reinforcing or other fillers such as alumina trihydrate, hydrated silicas or calcium carbonate can be added to the foams and the presence of these and other conventional additives should in no way be construed as falling outside the scope of this invention.

Also, as mentioned above, blends of this invention can be crosslinked at moderate temperatures by conventional free radical and/or sulfur curing techniques when minor amounts of unsaturated groups W are present in the phosphazene polymer backbone. The ability of these blends to be cured at temperatures below about 350° F. makes them particularly useful as potting and encapsulation compounds, sealants, coatings and the like. These blends are also useful for preparing crosslinked foams which exhibit significantly increased tensile strengths over uncured foams. These blends are often crosslinked in the presence of inert, reinforcing or other fillers and/or pigments and the presence of these and other conventional additives are deemed to be within the scope of this invention.

If desired, where the elastomer contains crosslinking functionality other than unsaturation, it may be desirable to incorporate known vulcanizers or crosslinkers for that functionality in conventional amounts. By the selection of such crosslinkers, one or two stage cures may be achieved as desired to modify the foaming, molding or coating characteristics of the blends.

The following examples are set forth for purposes of illustration only and are not to be construed as limitations of the present invention except as set forth in the appended claims. All parts and percentages are by weight unless otherwise indicated.

In the following examples Oxygen Index (OI) was determined according to the procedure described in ASTM D-2863-74, "Flammability of Plastics Using the Oxygen Index Method". By this method, foam samples which are 6 × .5 × .5 in., are burned and the oxygen index under a specific set of conditions is measured. It has been shown that this technique actually measures the lowest oxygen concentration in an atmosphere which will just prevent sustained burning of a top-ignited sample (see Fenimore et al, *Combustion and Flame*, 10, 135 (1966). The oxygen index values also have been related to the temperature at which a mixture of fuel and a controlled flow of oxygen will just burn when the fuel is composed of volatile pyrolytic products or fragments (see Johnson et al, *Rubber Age*, 107 (No. 5) 29 (1975).

Smoke-evolution properties of foams were evaluated by using an Aminco-NBS Density Chamber (Model 4-5800, Aminco-NBS Smoke Density Chamber, American Instrument Co.), as described by Gross et al, "A Method of Measuring Smoke Density from Burning Materials", ASTM SPT-422 (1967). Samples were tested using the flaming and non-flaming test modes. This small scale test subjects a sample to the two general conditions which prevail in the majority of "real" fires and especially in tunnel tests. The smoke value per gram (SV/g) was obtained by dividing the NBS smoke result, Dm, by the sample weight that was tested. The maxmum specific optical density Dm, corrected for soot deposits on the cell windows was also measured. The average value of Dm(corr) using both the flaming and non-flaming modes was also calculated. An average Dm(corr) value of 450 as determined by the NBS Smoke Density Chamber has been adopted as a regulation value by the U.S. Department of Health, Education and Welfare, see HEW Publication No. (HRA) 74-4000 (1974). Generally, NBS smoke values of 450 or less are normally required in those fire or code regulations restricting smoke evolution.

The following formulation and method was employed in Examples 1-14:

|  |  | Parts by Weight |
|---|---|---|
| Cup A* | Polyphosphazene | X |
|  | Organic polymer | Y |
| Cup B | 1,1'-azobisformamide | 20 |
|  | oil treated urea (activator) | 5 |
|  | magnesium oxide | 5 |
|  | zinc stearate | 10 |
|  | cumarone indene resin (Cumar P-10) | 2 |
|  | 2,5-dimethyl-2,5 di t-butyl peroxyhexane | 6 |
|  | benzoyl peroxide (78% active) | 2 |
|  | dicumyl peroxide | 1 |
|  | alumina trihydrate | 100. |

*Based on X+Y=100 parts.

Polymers were blended on two-roll mill with one roll at 120°-140° F. and the other at ambient conditions. Samples in Cup A were blended for 15 minutes to ensure homogeneous mixing. The ingredients in Cup B were added to the polymer blend on the research mill. This was allowed to mix for an additional 15 minutes. The unexpanded blend was then precured in a press for one minute at a temperature of 220° F. and pressure of 2000 psi. Finally, the precured pad was free expanded in a circulating air oven for 30 minutes at 300° F.

EXAMPLE 1

Using the formulation and method described above, were $X = 25$ parts of $[NP(OC_6H_4\text{---}4\text{---}OCH_3)(OC_6H_4\text{---}4\text{---}sec\ C_4H_9)]_n$ (see Example 7 of application Ser. No. 661,862, filed Feb. 12, 1976) and $Y = 75$ of a butadiene-acrylonitrile copolymer resin comprising 40% acrylonitrile and 60% butadiene and being characterized by a Mooney viscosity of 90 and a specific gravity of 1.0. The resulting foam was flexible and dark tan in color. NBS Smoke Chamber testing in the flaming mode resulted in the value Dm(corr)=253; SV/g=9. O.I.=35.5. Density=38.5 lb/ft³.

EXAMPLE 2

Using the method, formulation and polymers as in Example 1, where $X=50$ parts and $Y=50$ parts, the polymers and ingredients were blended and foamed. The resulting foam was tan in color and flexible. Dm(corr)=244; SV/g=9. O.I.=35.6. Density=48.0 lb/ft³.

EXAMPLE 3

Using the method, formulation and polymers as in Example 1, where $X=75$ parts and $Y=25$ parts, the polymers and ingredients were blended and foamed. The resulting foam was tan in color and flexible. Dm(corr)=134; SV/g=7. O.I.=34.5. Density=21.3 lb/ft³.

EXAMPLE 4

Using the formulation and method above, where $X=25$ parts of $[NP(OC_6H_4\text{---}4\text{---}OCH_3)(OC_6H_4\text{---}4\text{---}sec\ C_4H_9)]_n$ and $Y=75$ parts of cis-1,4-polybutadiene having a cis content of 98% and further characterized by a Mooney viscosity of 40 and specific gravity of 0.91. The polymers and ingredients were blended and foamed. The resulting foam was flexible and tan in color. NBS Smoke Chamber testing in the flaming mode resulted in the value Dm(corr)=133; SV/g=8. O.I.=26.8. Density=23.8 lb/ft³.

EXAMPLE 5

Using the formulation, method and polymers as in Example 4, where $X=50$ parts and $Y=50$ parts, the polymers and ingredients were blended and foamed. The resulting foam was flexible and tan in color. Dm(corr)=93; SV/g=6. O.I.=29.6. Density=19.2 lb/ft³.

EXAMPLE 6

Using the formulation, method and polymers as in Example 4, where $X=75$ parts and $Y=25$ parts, the polymers and ingredients were blended and foamed. The resulting foam was flexible and tan in color. Dm(corr)=114; SV/g=6. O.I.=30.3. Density=23.7 lb/ft³.

EXAMPLE 7

Using the formulation and method above, where $X=25$ parts of $[NP(OC_6H_4\text{---}4\text{---}OCH_3)(OC_6H_4\text{---}4\text{---}sec\ C_4H_9)]_n$ and $Y=75$ parts of ethylene-propylene copolymer rubber comprising ethylene and propylene linkages in a ratio as to yield a copolymer of Mooney viscosity 30 and specific gravity 0.86g/cc. The polymers and ingredients were blended and foamed. The resulting foam was flexible and tan in color. NBS Smoke Chamber testing in the flaming mode resulted in the value Dm(corr)=206; SV/g=12. O.I.=28.5. Density=42.1 lb/ft³.

EXAMPLE 8

Using the formulation, method and polymers as in Example 7, where $X=50$ parts and $Y=50$ parts, the polymers and ingredients were blended and foamed. The resulting foam was flexible and tan in color. Dm(corr)=238; SV/g=17. O.I.=31.4. Density=22.6 lb/ft³.

EXAMPLE 9

Using the formulation, methods and polymers as in Example 7, were $X=75$ parts and $Y=25$ parts, the polymers and ingredients were blended and foamed. The resulting foam was flexible and tan in color. Dm(corr)=258; SV/g=31. O.I.=30.5. Density=11.2 lb/ft³.

EXAMPLE 10

Using the formulation and method above, where $X=50$ parts of $[NP(OC_6H_4\text{---}4\text{---}OCH_3)(OC_6H_4\text{---}4\text{---}sec\ C_4H_9)]_n$ and $Y=50$ parts of poly(vinyl chloride) homopolymeric resin having a specific gravity of 1.40g/cc and $M_w$ of 50,000–52,000 as determined by gel permeation chromatography. The polymers and ingredients were blended and foamed. The resulting foam was flexible and tan in color. NBS Smoke Chamber testing in the flaming mode resulted in the value Dm(corr)=452; SV/g=20. O.I.'55.8. Density=52.8 lb/ft$^3$.

EXAMPLE 11

Using the formulation, method and polymers as in Example 10, where $X=75$ parts and $Y=25$ parts, the polymers and ingredients were blended and foamed. The resulting foam was flexible and tan in color. Dm(corr)=369; SV/g=30. O.I.=37.1. Density=21.9 lb/ft$^3$.

EXAMPLE 12

Using the formulation and method above, where $X=50$ parts of $[NP(OC_6H_4—4—OCH_3)(OC_6H_4—4—sec\ C_4H_9)]_n$ and $Y=75$ parts of Adiprene CM Rubber (a millable unsaturated urethane rubber with unsaturation—E. I. DuPont) of Mooney viscosity 60 and specific gravity 1.06g/cc. The polymers and ingredients were blended and foamed. The resulting foam was flexible and tan in color. NBS Smoke Chamber testing in the flaming mode resulted in a value of Dm(corr)=264; SV/g=18. O.I.=35.6. Density=25.7 lg/ft$^3$.

EXAMPLE 13

Using the formulation, method and polymers as in Example 12, where $X=50$ parts and $Y=50$ parts, th polymers and ingredients were blended and foamed. The resulting foam was flexible and tan in color. Dm(corr)=190; SV/g=24.0. O.I.=34.4. Density=11.4 lb/ft$^3$.

EXAMPLE 14

Using the formulation, method and polymers as in Example 12, where $X=75$ parts and $Y=25$ parts, the polymers and ingredients were blended and foamed. The resulting foam was flexible and tan in color. Dm(corr)=200; SV/g=28. O.I.=24.7. Density=9.7 lb/ft$^3$.

The following formulation and method were employed in Examples 15–26:

|  |  | Parts by Weight |
|---|---|---|
| Cup A* | Polyphosphazene | X |
|  | Organic polymer | Y |
| Cup B | alumina trihydrate | 125 |
|  | 1,1'azobisformamide | 20 |
|  | oil treated urea | 5 |
|  | zinc stearate | 10 |
|  | magnesium oxide dispersion | 5 |
|  | TiO$_2$ | 8 |
|  | sulfur | 2 |
|  | zinc dimethyldithiocarbamate | 1.5 |
|  | N,N'-dibutylthiourea | 0.4 |
|  | tellurium diethyldithiocarbamate | 0.4. |

*Based on X+Y=100 parts resin.

Polymers were blended on a two-roll research mill with one roll at 120°–140° F. and the other at ambient conditions. Samples in Cup A were blended for 15 minutes to ensure homogeneous mixing. The ingredients in Cup B were added to the polymer blend on the research mill. This was allowed to mix for an additional 15 minutes. The unexpanded blend was then precured in a press for one minute at a temperature of 180° F. and a pressure of 2000 psi. The pad was then cured at 180° F. for 120 minutes. Finally, it was free expanded in a circulating air oven for 20 minutes at 250° F. and 20 minutes at 325° F.

EXAMPLE 15

Using the formulation and method above, where $X=25$ parts of $[NP(OC_6H_5)_{.97}(OC_6H_4—4—C_2H_5)_{.97}(OC_6H_4—2—CH_2CH=CH_2)_{.06}]_n$ and $Y=75$ parts of ethylenepropylene unsaturated rubber comprising ethylene to propylene linkages in a ratio so as to yield a copolymer of Mooney viscosity 30 and specific gravity 0.86g/cc. The polymers and ingredients were blended and foamed. The resulting foam was flexible and off-white in color. NBS Smoke Density values were 216; SV/g=9 in the flaming mode. O.I.=31.8. Density=25.1 lb/ft$^3$.

EXAMPLE 16

Using the formulation, method and polymers as in Example 15, where $X=50$ parts and $Y=50$ parts, the polymers and ingredients were blended and foamed. The resulting foam was flexible and off-white in color. Dm(corr)=126; SV/g=9. O.I.=34.5. Density=17.3 lb/ft$^3$.

EXAMPLE 17

Using the formulation, method and polymers as in Example 15, where $X=75$ parts and $Y=25$ parts, the polymers and ingredients were blended and foamed. The resulting foam was flexible and off-white in color. Dm(corr)=151; SV/g=11. O.I.=41.3. Density=15.9 lb/ft$^3$.

EXAMPLE 18

Using the formulation and method above, where $X=25$ parts of $[NP(OC_6H_5)_{.97}(OC_6H_4—4—C_2H_5)_{.97}(OCH_2(CH_2)_2CH=CH_2)_{.06}]_n$ and $Y=75$ parts of ethylene-propylene copolymer rubber of Example 7. The polymers and ingredients were blended and foamed. The resulting foam was flexible and off-white in color. NBS Smoke Density values were 179 in the flaming mode. SV/g=7. O.I. =38.1. Density=27.0 lb/ft$^3$.

EXAMPLE 19

Using the formulation, method and polymers as in Example 18, where $X=50$ parts and $Y=50$ parts, the polymers and ingredients were blended and foamed. The resulting foam was flexible and off-white in color. Dm(corr)=130; SV/g=6. O.I.=34.1. Density=15.3 lb/ft$^3$.

EXAMPLE 20

Using the formulation, method and polymers as in Example 18, where $X=75$ parts and $Y=25$ parts, the polymers and ingredients were blended and foamed. The resulting foam was flexible and off-white in color. Dm(corr)=118; SV/g=9. O.I.=40.4. Density=15.3 lb/ft$^3$.

EXAMPLE 21

Using the formulation and method above, where $X=25$ parts of $[NP(OC_6H_5)_{.97}(OC_6H_4—4—C_2H_5)_{.97}(OC_6H_4—2—CH_2CH=CH_2)_{.06}]_n$ and $Y=75$ parts of Adiprene CM rubber of Example 12. The polymers and ingredients were blended and foamed. The resulting foam was flexible and off-white in color. NBS Smoke Density values were 119 in the flaming mode. SV/g=6. O.I.=36.7. Density=39.0 lb/ft$^3$.

EXAMPLE 22

Using the formulation, method and polymers as in Example 21, where $X=50$ parts and $Y=50$ parts, the polymers and ingredients were blended and foamed. The resulting foam was flexible and off-white in color. Dm(corr)=82; SV/g=5. O.I.=38.8. Density=22.2 lb/ft$^3$.

EXAMPLE 23

Using the formulation, method and polymers as in Example 21, where $X=75$ parts and $Y=25$ parts, the polymers and ingredients were blended and foamed. The resulting foam was flexible and off-white in color. Dm(corr)=104; SV/g=9. O.I.=39.9. Density=14.1 lb/ft$^3$.

EXAMPLE 24

Using the formulation and method above, where $X=25$ parts of [NP(OC$_6$H$_4$—4—OCH$_3$) (OC$_6$H$_4$—4—sec C$_4$H$_9$)]$_n$ and $Y=75$ parts of ethylene-propylene unsaturated rubber of Example 15. The polymers and ingredients were blended and foamed. The resulting foam was flexible and off-white in color. NBS Smoke Density values were 188 in the flaming mode. SV/g=7. O.I.=36.0. Density=50.7 lb/ft$^3$.

EXAMPLE 25

Using the formulation, method and polymers as in Example 24, where $X=50$ parts and $Y=50$ parts, the polymers and ingredients were blended and foamed. The resulting foam was flexible and off-white in color. Dm(corr)=469; SV/g=15. O.I.=40.9. Density=53.0 lb/ft$^3$.

EXAMPLE 26

Using the formulation, method and polymers as in Example 24, where $X=75$ parts and $Y=25$ parts, the polymers and ingredients were blended and foamed. The resulting foam was flexible and off-white in color. Dm(corr)=317; SV/g=10. O.I.=43.4. Density=53.9 lb/ft$^3$.

Other resins and adjuvants such as those described hereinabove may be substituted for those of the Examples. Likewise, the exemplified procedures may be modified as will be apparent to those skilled in the art. Omission of blowing agents provides non-cellular cured products.

According to the provisions of the Patent Statutes there are described the invention and what are now considered to be its best embodiments. However, within the scope of the appended claims, it is to be understood that the invention can be practiced otherwise than as specifically described.

What is claimed is:

1. A foamed blend comprising:
   A. a polyphosphazene comprising randomly distributed repeating units represented by the formulas:

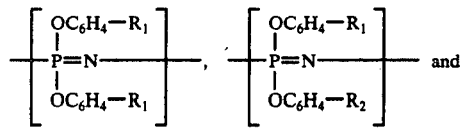
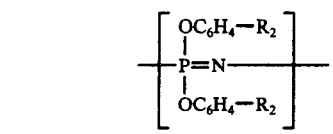

wherein R$_1$ and R$_2$ are the same or different and are hydrogen, a C$_1$ - C$_{10}$ linear or branched alkyl radical, or a C$_1$ - C$_4$ linear or branched alkoxy radical subtituted on any sterically permissible position on the phenoxy group,
   B. a foamable compatible organic polymer,
   C. said polymer (A) being present in an amount of about 15% to about 85% by weight and said polymer (B) being present in an amount of about 85% to about 15% by weight based on the combination of (A) and (B).

2. A foamed blend, as in claim 1, where the organic polymer is a vulcanizable elastomer.

3. A foamed blend, as in claim 1, where the organic polymer is a thermoplastic non-elastomeric organic polymer.

4. A foamed blend, as in claim 1, where the organic polymer is an unsaturated polyester.

5. A foamed blend, as in claim 1, where the polyphosphazene (A) (1) has randomly distributed repeating units represented by the formulas:

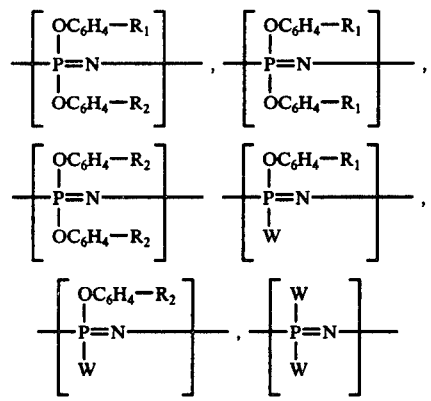

where W is a substituent capable of a crosslinking chemical reaction.

6. A foamed blend, as in claim 5, where the organic polymer is a vulcanizable elastomer.

7. A foamed blend, as in claim 5, where the organic polymer is a thermoplastic non-elastomeric organic polymer.

8. A foamed blend, as in claim 5, where the organic polymer is an unsaturated polyester.

* * * * *